United States Patent [19]

Kuwabara et al.

[11] Patent Number: 4,848,826
[45] Date of Patent: Jul. 18, 1989

[54] LUGGAGE CARPET FOR MOTOR VEHICLE

[75] Inventors: Akira Kuwabara; Manabu Sakamoto, both of Ayase, Japan

[73] Assignee: Ikeda Bussan Co., Ltd., Ayase, Japan

[21] Appl. No.: 65,751

[22] Filed: Jun. 24, 1987

[30] Foreign Application Priority Data

Jun. 25, 1986 [JP] Japan .................................. 61-95986
Dec. 25, 1986 [JP] Japan ................................. 61-198270

[51] Int. Cl.⁴ .............................................. B60N 3/04
[52] U.S. Cl. ................................. 296/97.23; 296/65.1; 296/37.16
[58] Field of Search ..................... 296/1 F, 1 R, 65 R, 296/63, 37.16, 37.14; 297/378–382

[56] References Cited

U.S. PATENT DOCUMENTS 3,659,894 5/1972 Dodgen et al. ................... 296/37.14
4,536,025 8/1985 Yamasaki et al. ................. 296/37.16

Primary Examiner—Robert R. Song
Attorney, Agent, or Firm—Foley & Lardner, Schwartz, Jeffery, Schwaab, Mack, Blumenthal & Evans

[57] ABSTRACT

A luggage carpet laid over a luggage room floor of a motor vehicle and rear surface of a seat back of a seat located adjacent to the luggage room. The portions of the carpet located at a region extending substantially along and in the vicinity of a boundary between the seat back and the luggage room floor have respective surface areas disposed in opposition to each other on a same surface of the carpet, said portions being joined together at respective ends in said opposite surface areas to form at least a hinge.

9 Claims, 5 Drawing Sheets

LUGGAGE CARPET FOR MOTOR VEHICLE

BACKGROUND OF THE INVENTION

1. Field of the Invention

The present invention relates to a luggage carpet to be laid over a luggage room floor of a motor vehicle. In particular, the present invention is concerned with a hinge structure for such luggage carpet.

2. Description of the Prior Art

For having a better understanding of the present invention, a hitherto known luggage carpet will be described by referring to FIGS. 1 and 2 of the accompanying drawings in which FIG. 1 shows in a sectional view a prior known luggage carpet for a motor vehicle in the state in which an associated seat back of a rear seat is folded in the forward direction, and FIG. 2 shows in a sectional view the same in the state in which the seat back is standing upright. In general, in the case of certain types of motor vehicles such as wagon, hatchback car or the like, the seat back 1a of a rear seat 1 is implemented to be forwardly tiltable so that a luggage (or baggage) room can be extended. In this connection, it is noted that a luggage carpet 4 covering a luggage floor 3 is usually so laid as to cover at least particularly the rear face of the seat back 1a. Accordingly, it is preferred from the aesthetic viewpoint that the luggage carpet 4 is implemented in a hinged structure realized at and along a location where the carpet is forced to bend when the seat back 1a is erected from the folded state, as is illustrated in FIG. 2.

FIG. 3 of the accompanying drawings shows a typical one of the hinge structures for the luggage carpet known heretofore. As will be seen in the figure, a sheet of carpet is linearly cut to be separated into a carpet portion 4a to be laid over the rear face of the rear seat back and a carpet portion 4b to be laid over the floor of the luggage room. The separated carpet portions 4a and 4b are then interconnected by sewing with a thread 5a in a zig-zag pattern, being followed by sewing with a thread 5b in a linear pattern, whereby the hinge structure is realized. Parenthetically, it should be mentioned that although the carpet portions 4a and 4b are shown in the separated state, they are actually located or abutted closely to each other.

With the hinge structure mentioned above, the interconnected portion of the carpet should ideally be bent or folded in such a configuration as illustrated in a phantom image in FIG. 2, when the seat back 1a is erected. However, in practice, the hinged portion of the carpet often tends to bend in a manner illustrated in solid lines in FIG. 2 due to the rearward movement of the lower portion of the seat back 1a upon erecting thereof, thus giving rise to a problem that not only the aesthetic appearance of the luggage carpet is degraded but also the luggage room is correspondingly narrowed, involving inconvenience for the use of the room. This problem becomes significant in case the carpet has a high rigidness or when the carpet undergoes thermal expansion due to increasing in the ambient temperature.

Additionally, because the hinge structure is realized by sewing together the discrete carpet portions 4a and 4b in the zig-zag pattern, being followed by the linear sewing, the steps for fablicating the hinged carpet will be correspondingly increased in the number. Besides, the edge of the carpet portion resulting from the cutting thereof must be appropriately processed to ensure a good appearance, the hinge carpet becomes expensive, to further disadvantage.

SUMMARY OF THE INVENTION

It is therefore an object of the present invention to provide a luggage carpet for a motor vehicle provided with a hinge structure which can be implemented inexpensively in a much facilitated and simplified manner so that the carpet can be bent without impairing the aesthetic appearance thereof when an associated seat back is set upright.

In view of the above object, there is provided according to an aspect of the present invention a luggage carpet for a motor vehicle to be laid over a floor of a luggage room of the vehicle and additionally over the rear face of a seat back of a rear seat, wherein portions of the carpet located substantially in the vicinity of and along a boundary between the seat back and the luggage room floor have respective surface areas on a same surface of the carpet where the carpet portions are joined together to form at least a hinge about which the carpet can be folded.

In accordance with the teachings of the present invention, the hinge can be formed in a much facilitated manner simply by folding or dividing an original luggage carpet into carpet component portions and joining together the carpet portions over the areas of the same surface of the original carpet located along and in the vicinity of the folding line or the edges resulting from the division. Upon erecting of the seat back, the hinge thus formed is unlikely to project inwardly of the luggage room in an aesthetically discomfortable manner, whereby neither the aesthetic appearance of the luggage room nor the utility thereof is impaired.

DESCRIPTION OF THE PREFERRED EMBODIMENTS

Now, the invention will be described in detail in conjunction with exemplary or illustrative embodiments thereof by referring to the accompanying drawings.

Figure 4:
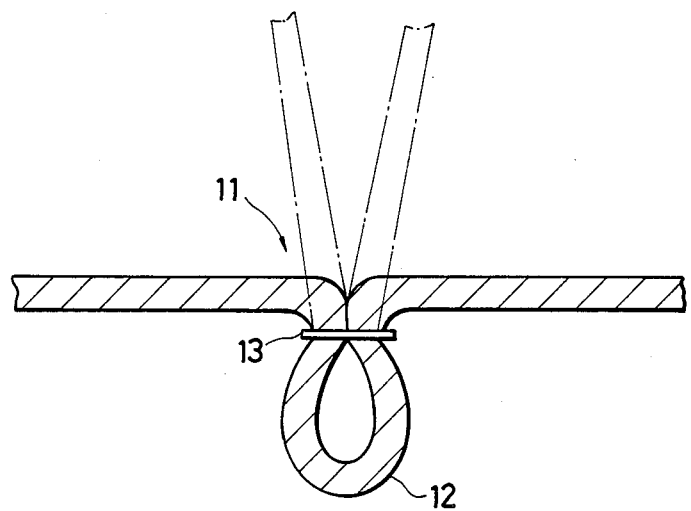
FIG. 4 is a schematic sectional view showing a main portion of a luggage carpet for a motor vehicle according to a first embodiment of the present invention.
Figure 5:
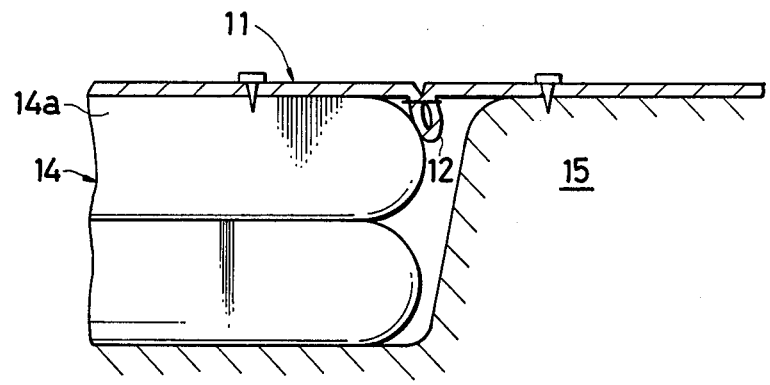
FIG. 5 is a schematic sectional view of the same carpet in the state in which an associated seat back is folded forwardly.
Figure 6:
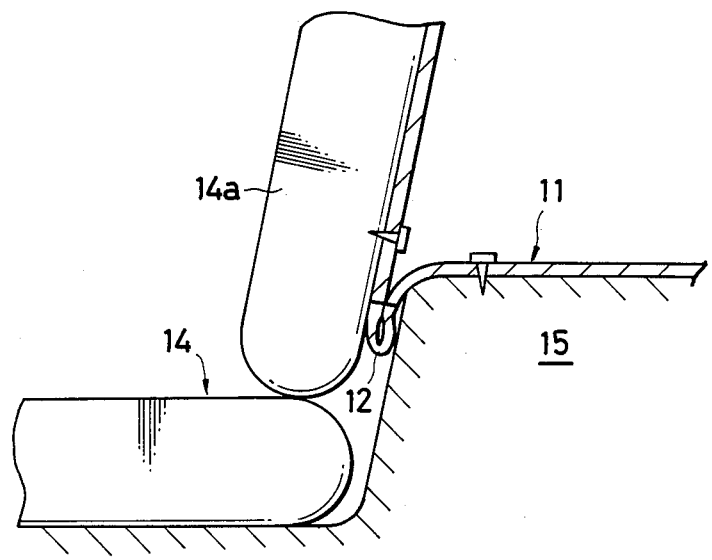
FIG. 6 is a schematic sectional view showing the same in the state in which the seat back is erected.

Reference is first made to FIGS. 4 to 6 in which FIG. 4 shows in a sectional view a main portion of a luggage carpet structure for a motor vehicle according to a first embodiment of the invention, and FIGS. 5 and 6 are views for illustrating what configuration the carpet assumes in dependence on the position of an associated seat back of a rear seat.

In FIG. 4, a luggage carpet generally denoted by a reference numeral 11 is folded double, as indicated by phantom lines, whereby a loop-like ridge portion 12 is formed. The carpet 11 is then joined together over a linear transverse region distanced slightly from the rigid portion 12 and extending in parallel therewith by sewing with a thread 13 by means of a sewing machine to thereby form a hinge. As will be seen, in the case of the first embodiment of the present invention, a single sheet of carpet 11 is employed, which is folded double, as shown in FIG. 4, wherein the carpet portions have respective surface areas disposed in opposition to each other are joined together by sewing in the direction widthwise of the carpet.

Figure 1:
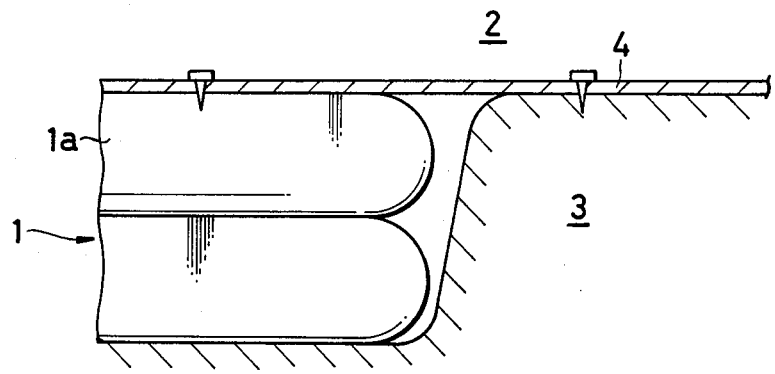
FIG. 1 is a sectional view showing a hitherto known luggage carpet for a motor vehicle in the state in which a seat back is folded forwardly.
Figure 2:
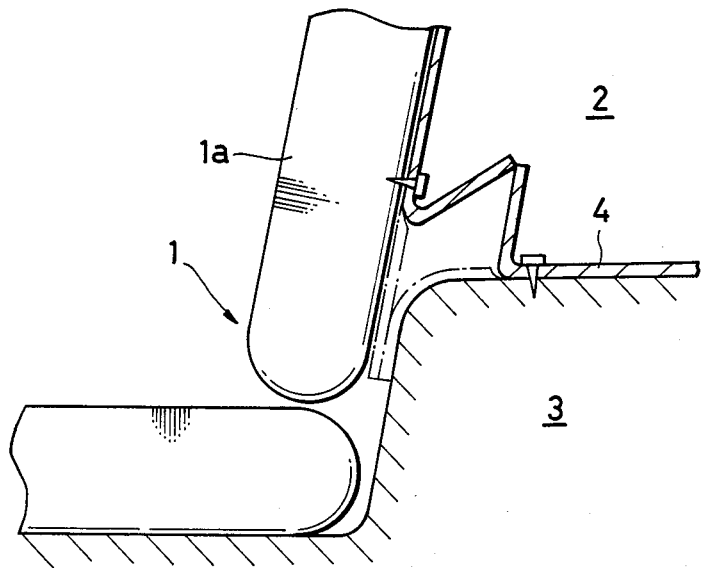
FIG. 2 is a view similar to FIG. 1 but shows the luggage carpet in the state in which the seat back is erected.
Figure 3:
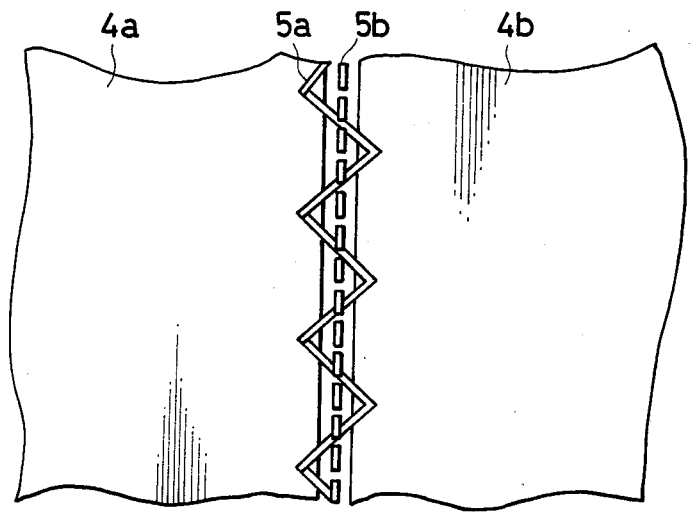
FIG. 3 is a plan view showing a hitherto known hinge structure implemented in the carpet.

When the carpet structure described above is laid flat, the constricted ridge portion 12 projects downwardly, as indicated by solid lines. On the other hand, when the carpet 11 is folded, as indicated by phantom lines, the joint 13 serves for the function of a hinge about which the carpet can be folded. In that case, since the loop-like ridge portion 12 remains in the position extending downwardly, no protrusion will be produced within the luggage room in contrast to the hitherto known carpet structure (see FIG. 2).

In the case of the carpet structure described above, it has been assumed that the joint or hinge is formed by sewing together the opposite surface areas of the carpet resulting from the folding thereof, it should be understood that the joint can also be realized by high-frequency welding, ultrasonic welding, tacks or the like means. Further, although it has been described that the carpet structure described above is realized starting from a single sheet of carpet material, it will be appreciated that the carpet can be cut into two sheets or alternatively two sheets of discrete carpets may be used, wherein those opposite edge portions of the two sheets of carpet which are located along and in the vicinity of the boundary between the luggage room floor and the seat back are joined together to form the hinge.

When the carpet 11 of the structure described above is installed within a motor vehicle, the carpet is so laid as to cover the luggage room floor 15 and the rear surface of the seat back of the rear seat which has been previously folded forwardly. For securing fixedly the carpet, clips, bonding tape having both surfaces applied with adhesive or the like may be employed. The ridge or edge portion is constantly positioned between the rear seat 14 and the luggage room floor 15 with a smaller distance relative to the former. The ridge portion 12 can remain in the state projecting downwardly even when the rear seat back 14a is erected, as is illustrated in FIG. 6, whereby the aesthetic appearance of the luggage room will never be impaired.

Figure 7:
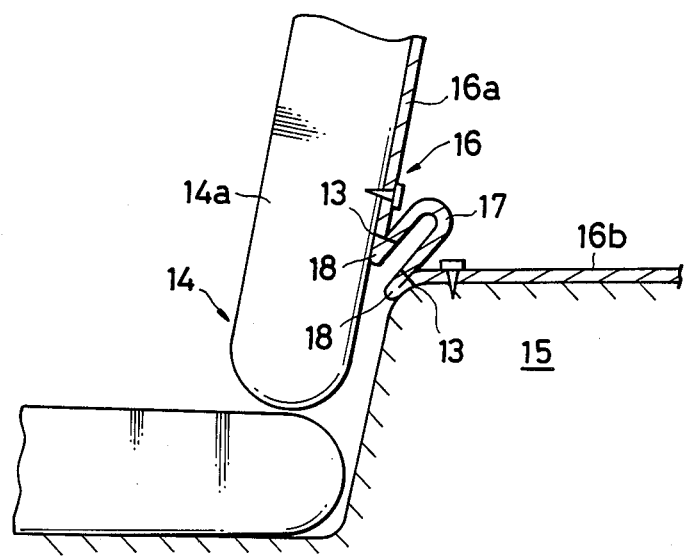
FIG. 7 is a schematic sectional view showing a main portion of the luggage carpet for a motor vehicle according to a second embodiment of the present invention.

FIG. 7 shows in a sectional view a main portion of the luggage room carpet for a motor vehicle according to a second embodiment of the present invention.

As will be seen in the figure, the luggage room carpet generally denoted by 16 is provided with a pair of hinges 13 by forming a loop-like fold 17 in the direction widthwise of the carpet along the boundary between the seat back 14 and the luggage room and joining together the the base portions of the loop-like fold 17 and the adjacent opposite end portions of the carpet regions covering the rear face of the seat back and the luggage room floor, respectively, as indicated at 18. Thus, the loop-like fold 17 is positioned substantially at the boundary between the carpet portion 16a laid over the rear face of the seat back 14a and the carpet portion 16b laid over the luggage room floor 15, and is so sized that when the seat back 14a is folded forwardly, the whole carpet is laid flat with the fold 17 being resiliently unfolded. The joint or hinge 18 is of substantially same structure as the one shown in FIG. 4. For realizing the joint or hinge, the relevant portions of the carpet may be sewed together.

In this manner, by forming the loop-like fold 17 as well as hinges 13 at both base portions thereof, respectively, and imparting a deformation permanently, the fold 17 can be so formed substantially along the boundary between the carpet portions 16a and 16b as to protrude inwardly of the luggage room only a small distance at an angle of about 45°. Of course, the fold 17 is unfolded substantially flat upon folding the seat back 14a forwardly.

With the carpet structure shown in FIG. 7, the fold 17 is fixedly positioned with an inclination angle of about 45° without impairing the aesthetic appearance of the luggage carpet.

Figure 8:
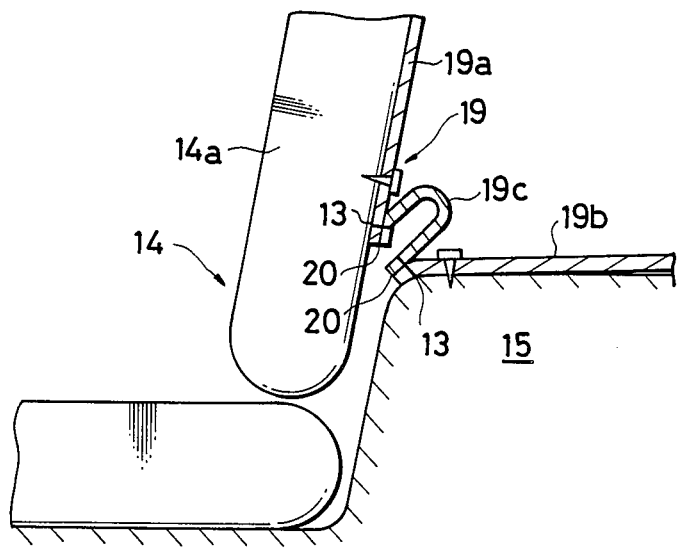
FIG. 8 is a schematic sectional view showing a version of the luggage carpet shown in FIG. 7.

FIG. 8 is a view showing a version of the luggage carpet structure 16 shown in FIG. 7.

Referring to the figure, a luggage room carpet 19 for a motor vehicle is composed of a first carpet portion 19a laid over the rear surface of a seat back 14a, a second carpet portion 19b laid over a luggage room floor and an intermediate carpet portion 19c disposed between the carpet portions 19a and 19b, wherein the opposite end areas 20 of the carpet portions 19a and 19c are joined together to form one hinge 13, while the opposite end areas or regions 20 of the carpet portions 19b and 19c cooperate to form the other hinge 13. To this end, the opposite end regions or areas of the combined carpet portions may be superposed each other and secured together by sewing with a thread. In the case of the embodiment shown in FIG. 8, the carpet 19c is folded with an inclination at an angle of about 45° when the seat back 14a is erected, while the folded carpet portion 19c is laid flat upon folding of the seat back forwardly.

Figure 9:
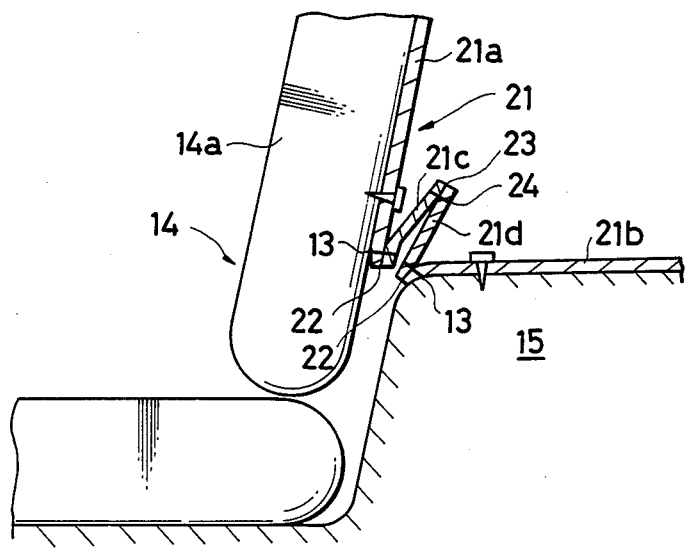
FIG. 9 is a sectional view showing a main portion of the luggage carpet according to a third embodiment of the present invention.
Figure 10A:
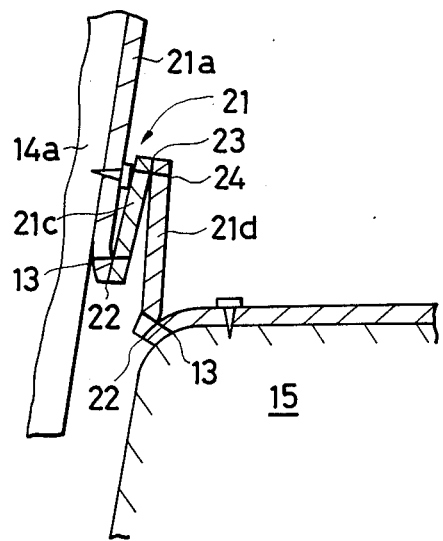
FIG. 10A is a schematic sectional view showing a modification of the luggage carpet structure shown in FIG. 9 in which a carpet portion of the carpet laid on the luggage room floor which portion constituting a hinge member is selected longer than that of the carpet laid over the rear face of an associated seat back.
Figure 10B:
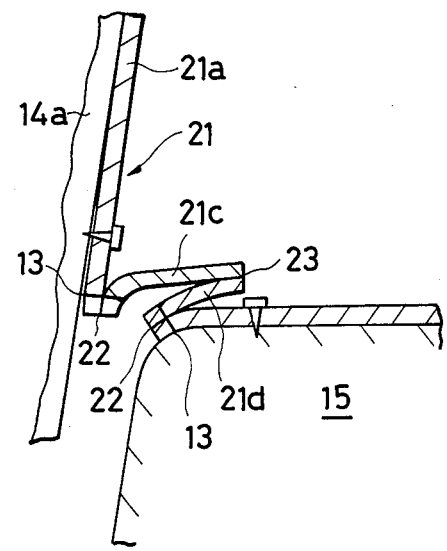
FIG. 10B is a schematic sectional view showing another modification of the luggage carpet structure shown in FIG. 9 in which a carpet portion of the carpet laid over the rear face of the associated seat back and which constitutes a hinge member sized longer than that of the carpet laid over the luggage room floor.

FIG. 9 shows a third embodiment of the present invention which is so designed that the fold or bend formed by the carpet portion 19c shown in FIG. 8 can always extend in a preset direction whenever the seat back 14a is set upstanding.

More specifically, referring to FIG. 9, the luggage room carpet 21 for a motor vehicle is composed of a carpet portion 21a laid over the rear surface of the seat back, a carpet portion 21b laid over the luggage room floor 15, and a pair of carpet portions 21c and 21d both of which are disposed between the carpet portions 21a and 21b. The opposite end areas or regions 22 of the carpet portions 21a and 19c are superposed onto each other and joined together widthwise of the carpet. Similarly, the opposite end areas or regions 22 of the carpet portions 21b and 21d are joined together. For the purpose of joining the carpet portions over the opposite surface areas, they may be sewed together with a thread 13. Additionally, the top end regions of the interposed carpet portions 21c and 21d are also sewed together with a thread 13 widthwise of the carpet.

With the structure shown in FIG. 9, the interposed carpet portions 21c and 21d protrude inwardly of the luggage room with a substantially fixed inclination angle of about 45° when the seat back is erected.

In connection with the structure shown in FIG. 9, the interposed carpet portion 21d may be selected longer than that of the carpet portion 21c so that the joined carpet portion 21c and 21d will tend to be inclined closer to the rear face of the seat back 14a, whereby the carpet portion 21c is covered by the carpet portion 21d. Reversely, when the length of the carpet portion 21c is selected longer than that of the carpet portion 21d, the joined carpet portions 21c and 21d is inclined closer toward the luggage room floor 15 to the state the carpet portion 21d is covered by the carpet portion 21c. In this manner, by selecting previously the lengths of the carpet portions 21c and 21d in consideration of the angle of inclination at the time when the seat back is erected, the aesthetic appearance of the carpet 21 as a whole can be further improved.

We claim:

1. A luggage carpet laid over a luggage room floor of a motor vehicle and a rear face of a seat back of a seat located adjacent to the luggage room, wherein the portions of said carpet located at a region extending substantially along and in the vicinity of a boundary between said seat back and said luggage room floor have respective opposite surface areas disposed in opposite to each other on a same surface of said carpet, said carpet portions being joined together in said opposite surface areas thereby to form at least a hinge protruding below the luggage room floor about which said carpet can be folded.

2. A luggage carpet for a motor vehicle according to claim 1, wherein said opposite surface areas are created by folding double a single sheet of the carpet.

3. A luggage carpet for a motor vehicle according to claim 1, wherein a single hinge is provided in the carpet by joining together the opposite surface areas created at one location.

4. A luggage carpet for a motor vehicle according to claim 1, wherein a pair of hinges are provided in the carpet by joining together said opposite surfaces areas created at two discrete locations, respectively.

5. A luggage carpet laid over a luggage room floor of a motor vehicle and a rear face of a seat back of a seat located adjacent to the luggage room, wherein portions of said carpet located at a region extending substantially along and in the vicinity of a boundary between said seat back and said luggage room floor have respective opposite surface areas disposed in opposition to each other on a same surface of said carpet, said carpet portions being joined together in said opposite surface areas thereby to form at least a hinge about which said carpet can be folded, said luggage carpet being composed of a first carpet portion laid over the rear face of said seat back, a second carpet portion laid over said luggage room floor and a third carpet portion interposed between said first and second carpet portions, and in which a pair of hinges constituted by joining together the opposite surface areas are provided at two locations, respectively, one of which corresponds to a junction between first and third carpet portions with the other corresponding to a junction between said second and third carpet portions.

6. A luggage carpet laid over a luggage room floor of a motor vehicle and a rear face of a seat back of a seat located adjacent to the luggage room, wherein portions of said carpet located at a region extending substantially along and in the vicinity of a boundary between said seat back and said luggage room floor have respective opposite surface areas disposed in opposition to each other on a same surface of said carpet, said carpet portions being joined together in said opposite surface areas thereby to form at least a hinge about which said carpet can be folded, said luggage carpet being composed of a first carpet portion laid over the rear face of the seat back, a second carpet portion laid over said luggage room floor, a third carpet portion connected to said first carpet portion and a fourth carpet portion connected to said second carpet portion, said third and fourth carpet portions being disposed between said first and second carpet portions, said hinge constituted by the opposite surface areas being provided at three locations corresponding to a junction between said first and third carpet portions, a junction between said second and fourth carpet portions and a junction between said third and fourth carpet portions, respectively.

7. A luggage carpet for a motor vehicle according to claim 6, wherein the length of said fourth carpet portion is selected greater than that of said third carpet portion so that said third carpet portion is pressed toward the rear face of said seat back by said fourth carpet portion.

8. A luggage carpet for a motor vehicle according to claim 6, wherein the length of said third carpet portion is selected greater than that of said fourth carpet portion so that said fourth carpet portion is pressed toward the luggage room floor by said third carpet portion.

9. A luggage carpet laid over a luggage room floor of a motor vehicle and a rear face of a seat back of a seat located adjacent to the luggage room, wherein portions on a luggage supporting surface of said carpet located at a region extending substantially along and in the vicinity of a boundary between said seat back and said luggage room floor, are folded together and retained in abutment to form a hinge about which said carpet can be folded, said hinge protruding in a direction below said luggage supporting surface.

* * * * *